United States Patent Office 2,765,213
Patented Oct. 2, 1956

2,765,213

BASIC ALUMINUM SULFAMATES AND PROCESS FOR MAKING THEM

Stewart M. Beekman, Berkeley Heights, N. J., assignor to Reheis Company, Inc., a corporation of New York No Drawing. Application June 9, 1953,
Serial No. 360,610

7 Claims. (Cl. 23—114)

This invention relates to basic aluminum salts of sulfamic acid and the method of making them.

Aluminum sulfamate is known. It has been made in aqueous solution by the reaction of a reactive aluminum hydroxide gel with a water solution of sulfamic acid. This reaction requires the preparation initially of the reactive aluminum hydroxide gel and also involves difficulty in efforts to make a clear product.

The present invention provides a method that does not require the preparation of the reactive aluminum hydroxide gel but that results in a relatively clear solution.

Briefly stated, my invention comprises the method of making aluminum sulfamate by maintaining contact between aluminum, water, and sulfamic acid in proportion that is substantial but less than 3 mols for 1 atom of aluminum dissolved, until a product of the desired basicity is obtained. The invention comprises also the herein described basic aluminum salts of sulfamic acid.

The reaction in my process may be represented by the following equations:

(1) 
Sulfamic acid
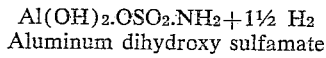
Aluminum dihydroxy sulfamate (2) 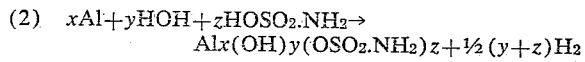

In the second and general Equation 2, $x$ is an integral number within the range 1–4 and $y$ and $z$ are numbers whose sum is $3x$. I find particularly satisfactory properties in my new composition when $y$ and $z$ each are at least as large as $x$. When $y$ equals at least $\frac{1}{2}\,z$, I obtain the basicity that is specially desirable in many compounded products, as in antiperspirant creams.

My method is applicable, however, in making products of hydroxy content as low as 1 hydroxyl group to 10 or somewhat more sulfamate groups.

As to materials, I use to advantage aluminum in finely divided form. The so-called atomized aluminum powder is particularly satisfactory. An example of such material is aluminum which has been reduced to the form of very fine powder by spraying through a nozzle into an evacuated chamber, a representative example of such product having an average particle size of about 17–18 microns.

The sulfamic acid $HOSO_2.NH_2$ that is used may be of the technical grade. As contacted with the aluminum, it is used in aqueous solution.

As to proportions, the ratio of aluminum dissolved to the sulfamic acid used is fixed by the basicity desired in the finished product. From the empirical formula which it is desired to establish in the finished product, the relative weights of the aluminum and sulfamic acid to be used are readily calculated. I have found, however, that the use of a substantial excess of the aluminum, with the removal of the excess (and also impurities associated initially with the aluminum) at the conclusion of the desired stage of the reaction, is desirable. With the introduction of such excess of aluminum, I have been able to shorten the time of total reaction required. Also I have found decreased tendency of the aluminum basic sulfamate solution to gel during the reaction when the time is thus reduced.

The proportion of water used in relation to the sulfamic acid is that required not only to furnish the hydroxyl groups for the reaction but also to maintain a suitable working consistency during the manufacture and subsequent separation step, if any, to remove the unreacted portion of the aluminum. I have found a satisfactory ratio of water to be one that gives 45–75 and in commercial operations 55–65 parts of water for 100 parts of the total solution during the manufacture step. Other proportions of water are less convenient. When more water is used there is either extra and unnecessary freight to pay on the water shipped or additional evaporation of water required before shipment. When too little water is used, the solution during manufacture becomes so thick as to be difficult to separate from remaining solid material, such as unreacted aluminum, or to fill into drums for shipment.

Products made as described herein have low acidity and are suitable for use in antiperspirants without the incorporation of an added antacid. When the proportion of hydroxyl groups is as high as two of the said groups to one sulfamate, my product may be dried to a solid containing some bound water. The solid may be readily ground to a powder that is substantially free from objectionable deliquescence on exposure to the atmosphere. Aluminum sulfamate of low ratio of hydroxyl groups, on the other hand, can not be dried to a non-deliquescent solid such as is essential for an antiperspirant or astringent composition in powder form.

As to conditions of manufacture more specifically, I mix the aluminum powder with good agitation into the aqueous solution of sulfamic acid. The contact is continued till analytical test on a sample shows that the proper proportion of aluminum has dissolved to fit the chemical equation of the desired reaction. I have found a tendency toward the formation in this reaction of by-product ammonium sulfate, that is, either normal or acid ammonium sulfate. This sulfate is ineffective as an astringent and tends to act as a gel coagulating agent which increases the possibility of premature coagulation of the desired sulfamate solution.

I have also discovered that in order to prevent the formation of this by-product sulfate in quantities that are commercially objectionable, it is necessary to keep the temperature of contact of the aluminum with the sulfamic acid to a level not above about 55° C. I find that this temperature control is particularly important during the early stages of the reaction if the formation of the sulfate is to be avoided. After this early stage has passed and a substantial proportion of the total sulfamic acid present is neutralized, then the temperature may be allowed to rise slowly. For safe working conditions I operate in commercial batches at temperatures not above 55° C. and usually not above 50° C. during all stages of the dissolving of the aluminum.

When the product has once been made, then it may be dried at somewhat higher temperatures than those used during the dissolving. Thus, I may evaporate a solution of my product by heating it in vacuo at a temperature of 70° C. or by spray drying. It may be exposed for short periods of time, at least, to temperatures as high as 100° C.

The invention will be further illustrated by detailed description in connection with the following specific examples. In these examples and elsewhere herein proportions are expressed as parts by weight except when specifically stated to the contrary.

EXAMPLE 1

*Preparation of aluminum dihydroxy sulfamate*
$Al(OH)_2(OSO_2.NH_2)$ 618 g. of technical sulfamic acid were added to 1200 ml. of tap water contained in a 3-liter round bottom flask equipped with a reflux condenser and agitator. The temperature of the sulfamic acid solution was raised to 50° C. and 183 g. of atomized aluminum (Reynolds 120) were added to the reaction flask. The temperature of the reaction was maintained at 50°, plus or minus 2° for 62 hours. The whole was then cooled and filtered, to separate the undissolved portion of the aluminum and impurities in the original aluminum. A part of the solution was dried at 70° C. in vacuo. The solution obtained was water white and clear. The aluminum content of the solution, calculated as Al, was 8.84%; the sulfamate content as $.OSO_2.NH_2$ was 30.5%; and sulfate was absent, that is, 0.0%. The pH of the solution was 2.8, the density 45.9° Bé. at 20° C., and the viscosity at 25° C. 43.5 cps. The mol ratio of Al to $.OSO_2.NH_2$ ratio was found to be 1:0.97. This means 0.97 $.OSO_2.NH_2$ and 2.03 OH groups to 1 Al.

After drying, the product had an Al content of 14.9%, sulfamate 50.6%, and sulfate content as $SO_3$ 0.12%. The dry product when dissolved in water formed clear, water white solutions of pH values, for different concentrations of the product in water, as follows:

| Concentration: | pH |
|---|---|
| 10% by weight | 3.77 |
| 20% | 3.62 |
| 30% | 3.46 |

EXAMPLE 2

*Aluminum monohydroxy disulfamate*
$Al(OH)(OSO_2.NH_2)_2$

The procedure of Example 1 was followed except as noted below. The proportion of aluminum was decreased to 94 g. of aluminum and the water was decreased to 1042 g. The time of reaction was approximately 50 hours at 50° C.

The product made had the elements and groups in the proportions represented by the formula immediately above. The pH of a 16% solution was approximately 3.13.

EXAMPLE 3

The procedure of Example 2 was followed except that the aluminum was used in the ratio of 4 atomic weights to 1 molecular weight of the sulfamic acid plus an additional amount of aluminum corresponding to a 10% excess over the 4 atomic weights. When 4 atomic weights of the aluminum had been dissolved at 50° C., then the resulting solution of the basic aluminum sulfamate was filtered and the excess of aluminum thus removed. The product had the approximate formula $$Al_4OH_{11}(OSO_2.NH_2)_1$$

EXAMPLE 4

The procedure of Example 1 is followed except that a large excess of aluminum was used and the contact of it with the water and sulfamic acid continued until the amount of the aluminum dissolved was 2 atoms for each mol of sulfamic acid used, the product being $$Al_2(OH)_5.OSO_2.NH_2$$

EXAMPLE 5

The procedure of Examples 1–4 above is followed except that the solution made in those examples is subjected to drying in vacuo at a temperature not above 70° C. to any substantial extent.

Products made as described are bacteriostats in that they inhibit or retard the growth of bacteria as determined by the F. D. A. Agar Cup method, the organism used being *Staphylococcus aureus*.

Examples of compounded antiperspirants follow.

EXAMPLE 6

*Antiperspirant cream, water-in-oil type*

| | Percent |
|---|---|
| Spermaceti | 1.5 |
| Amerchol CAB (cholesterol emulsifier) | 24.0 |
| Water | 24.5 |
| Aluminum monohydroxy sulfamate $Al(OH)(OSO_2NH_2)_2$ (40% solution) | 50.0 |
| Perfume | q.s. |

*Procedure.*—Add the water to the aluminum monohydroxy sulfamate solution, heat to 60° C. Mix and heat other ingredients to 60° C. Mix the whole rapidly until cool. Homogenize.

EXAMPLE 7

*Antiperspirant cream, oil-in-water type*

| | Percent |
|---|---|
| A. Stearic acid | 14 |
| Beeswax | 2 |
| Mineral oil | 1 |
| Myrj 52 (non-ionic polyoxy-alkylene derivative of higher fatty acids) | 5 |
| G-2162 (polyoxyethylene propylene glycol monostearate) | 5 |
| B. Water | 51 |
| Preservative | q.s. |
| C. Aluminum dihydroxy sulfamate (powder) $Al(OH)_2(OSO_2NH_2)$ | 22 |
| Perfume | q.s. |

*Procedure.*—Melt A at 70° C. Add B at 85° C. Cool to 35° C. and add all of C. Agitate until C is completely dissolved. Add perfume.

EXAMPLE 8

*Antiperspirant lotion*

| | Percent |
|---|---|
| A. Cetyl alcohol | 1.26 |
| Atlas G-2151 (polyoxyethylene stearate) | 2.51 |
| Stearic acid | 3.77 |
| B. Propylene glycol | 1.01 |
| Veegum (magnesium aluminum silicate) | 0.75 |
| Water | 70.60 |
| C. Aluminum dihydroxy sulfamate (powder) $Al(OH)_2(OSO_2NH_2)$ | 20.10 |

*Procedure.*—Heat A to 70° C. Add the veegum to propylene glycol and water slowly, continually agitating until smooth, heat to 70° C. Add B to A and mix until smooth and cool. Add C to cool mix of A and B, continue mixing until salts are thoroughly dispersed.

EXAMPLE 9

*Bromidrosis powder*

| | Percent |
|---|---|
| Talc | 70 |
| Starch ester | 5 |
| Boric acid | 5 |
| Aluminum 5/6 basic sulfamate $Al_2(OH)_5(OSO_2NH_2)$ | 20 |

The waxy components in Examples 7–9 make the compositions emollients for the skin. The emollient selected should be non-toxic and non-irritating under the conditions of use.

It will be understood that it is intended to cover all changes and modifications of the examples of the invention herein chosen for the purpose of illustration which do not constitute departures from the spirit and scope of the invention.

What I claim is:

1. In making aluminum basic sulfamate, the method which comprises mixing finely divided aluminum with an aqueous solution of sulfamic acid, in the ratio of substantially more than 1 atomic proportion of aluminum to 3 mols of sulfamic acid, maintaining the resulting mixture at an elevated temperature but not above about 55° C. until a substantial proportion of the sulfamic acid has been neutralized, and continuing the contact of the remaining aluminum and sulfamic acid until test of the resulting solution shows more than 1 atomic proportion of dissolved aluminum for 3 mols of sulfamic acid used, the whole procedure described giving an aqueous solution of aluminum basic sulfamate and the maintenance of the said temperature, not above about 55° C. until a substantial part of the sulfamic acid is neutralized, decreasing the formation of by-product ammonium sulfate.

2. The method of claim 1 which includes separating from the said solution the aluminum that remains undissolved after the basic sulfamate is produced.

3. The method of claim 1 which includes maintaining the said solution at an elevated temperature and under drying conditions until the water of the solution is evaporated.

4. An hydroxy sulfamate selected from the group consisting of aluminum monohydroxy disulfamate, aluminum dihydroxy monosulfamate, and aluminum hydroxy sulfamate containing 5 hydroxy groups for 1 sulfamate group.

5. A basic aluminum sulfamate of the approximate proportion of ingredients represented by the empirical formula $Al_2(OH)_5 \cdot OSO_2 \cdot NH_2$.

6. Aluminum monohydroxy disulfamate, the disulfamate being a solid at ordinary temperatures and, when dissolved in water in proportion to form a solution of concentration 16%, showing a pH of approximately 3.1.

7. Aluminum dihydroxy sulfamate of proportions of components represented by the formula $$Al(OH)_2 \cdot OSO_2NH_2$$

the sulfamate being a solid at ordinary temperatures and, when dissolved in water in proportion to form a solution of concentration 20%, showing a pH of approximately 3.6.

References Cited in the file of this patent

UNITED STATES PATENTS

| | | |
|---|---|---|
| 2,165,870 | McQueen | July 11, 1939 |
| 2,586,288 | Apperson | Feb. 19, 1952 |